July 2, 1957  J. Q. ADAMS  2,797,662
SELECTIVE PIG FEEDER
Filed Nov. 30, 1954
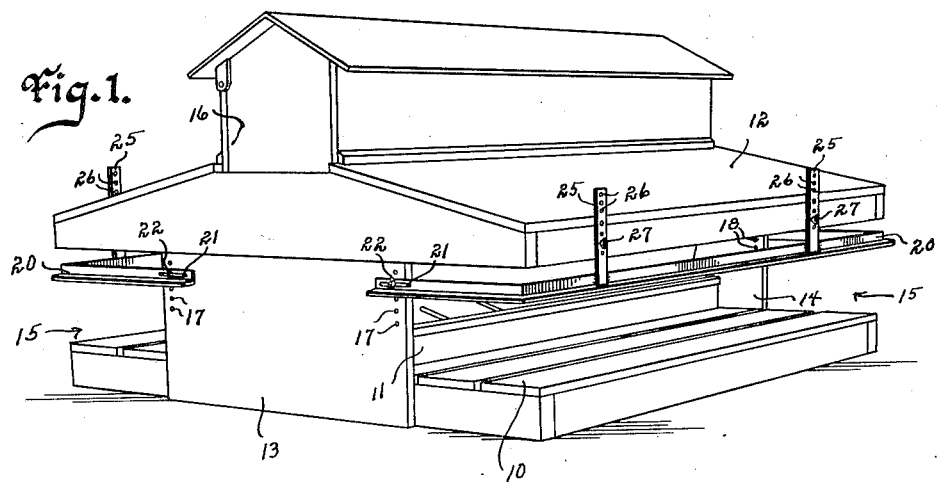
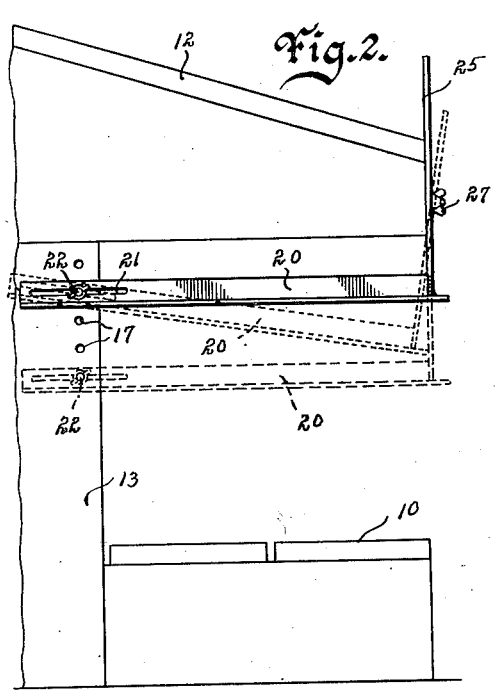
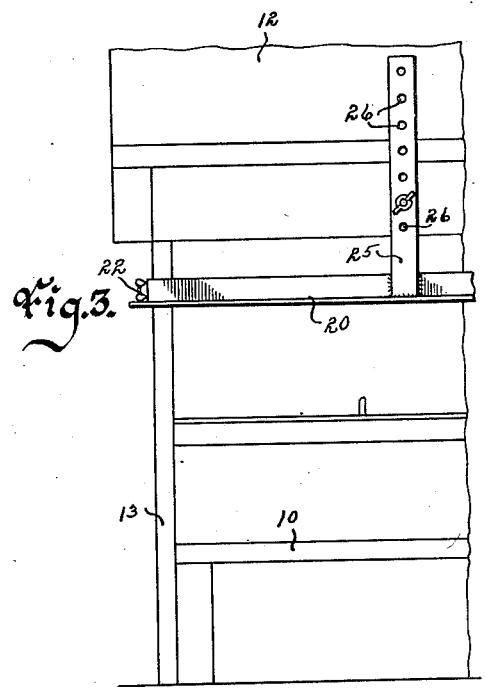
Inventor
John Q. Adams
by Talbert Dick & Adler
Attorneys
Witness
Edward P. Seeley

United States Patent Office 2,797,662
Patented July 2, 1957

2,797,662

SELECTIVE PIG FEEDER

John Q. Adams, Clark, Mo.

Application November 30, 1954, Serial No. 472,041

2 Claims. (Cl. 119—52)

This invention relates to pig feeders and more particularly to a pig feeder that may be adjusted for separating such livestock as to size.

Pig feeders are old in the art and are universally used for providing food for pigs as distinguished from the larger hogs. However, the present method of feeding is to place the feeder at a location that is denied the larger hogs. This, of course, presents many problems including two separate pens. The ideal method is to permit all sizes of the animals to be integrated and provide some means that can be used only by the smaller animals.

Therefore, one of the principal objects of my invention is to provide a pig feeder that may be easily and quickly adjusted for selecting by size the pigs that are to be serviced from a given feeder.

Another object of my invention is to provide a pig creep feeder for the purpose above set out that can be easily moved from place to place and is ready for use at any time.

A still further object of this invention is to provide a pig feeder which is designed so that the feeding pigs need not stand in the mud or dirt and are protected along with the feed from rain and the like.

Still another object of my invention is to provide a pig creep feeder of the above class that cannot be tipped or tilted either by the pigs or hogs.

These and other objects will be apparent to those skilled in the art.

My invention consists in the construction, arrangement and combination of the various parts of the device, whereby the objects contemplated are attained as hereinafter more fully set forth, specifically pointed out in my claims, and illustrated in the accompanying drawings, in which:

Fig. 1 is a perspective view of my feeder ready for use,

Fig. 2 is an enlarged end view of one side portion of my feeder and more fully illustrates the method of vertical space adjustment for pig selection, and Fig. 3 is an enlarged front side view of a corner portion of the feeder.

The basic feeder housing features are taught in my co-pending application on a Pig Creep Feeder, filed in the United States Patent Office on November 25, 1953. In general it consists of a horizontal base or flooring 10. In the center of this flooring is the trough 11. Over this trough portion and spaced above the flooring is a roof portion 12 as shown in Fig. 1. At each end of the trough and each end of the floor is a vertical end wall 13 and 14, respectively. These end walls support the roof portion and while their widths are much less than the width of the platform or flooring 10, they do shield the end portions of the trough 11. The roof or canopy structure portion 12 is substantially the same dimensions as the platform base, and as its lower trim extends in a horizontal plane spaced above the base, a limited passageway 15 will exist between each side roof portion and each side base platform for the entrance of pigs to the feeding trough. By this construction the pigs may feed from two directions. These spaces 15, however, are so limited in height between the platform base and roof that the large hogs cannot enter to feed from the trough. Thus, the housing will successfully separate the pigs from the hogs. The base platform, the wall ends and the roof must be secured as a unit and of strong structure inasmuch as hogs are rough in their attempt to get to troughs from which the pigs are feeding. The trough may be serviced from the feed bin portion 16. It is to such a housing that I apply my improved pig selector and which I will now describe in detail. As both sides of the feeder is a duplicate of the other and are treated alike, I will describe one side, it being understood that a duplicate unit, with duplicate numbers will be present at the other side of the feeder. In the marginal edge portion of the end wall 13, I provide a vertical row of spaced apart holes 17. A like vertical row of spaced apart holes 18 are formed in the end wall 14. The numeral 20 generally designates my U-shaped guard rail preferably of angle iron. The length between the two end arm portions of the guard rail is substantially equal to that distance between the outside surfaces of the end walls. In each end portion of the guard rail or bar is an elongated longitudinal slot 21 as shown in Fig. 2. Selectively through any hole in each of the two vertical rows of holes 17 and 18, I pass a wing nutted bolt 22, with the two bolts also extending through the two slots 21, respectively, in the two end portions of the railing bar 20. By this arrangement the ends of the railing bar guard will be pivotally secured to the end walls 13 and 14. The center elongated portion of the guard bar shield will be in a plane below the eave of the roof and the side arm portions of the same will be below the end planes of the roof as shown in Fig. 1. On the center portion of the guard shield, I secure by any suitable means such as welding or like a plurality of vertical bar posts 25. The free end portion of each of these bars have a row of holes 26. Selectively through these holes 26, I pass a winged nut bolt 27, which I have also passed through the trim frame of the eave of the roof as shown in Fig. 3.

The practical operation of the device is as follows: While the distance between the platform and roof will deny large hogs from the feeding trough, it often becomes necessary to select and separate even the pigs as to size. This control selection may be instantly had by adjusting my railing bar 20. The older group or groups of pigs may be bored by classification from the very young pigs. Obviously, as each group or size classification of pigs grow up, there comes a time when the raiser desires to separate their feeding from the younger and less strong pigs. This is not only necessary from the standpoint of small pig protection, but feeding habits, feed amounts, and type feeding changes as the pigs get older, larger and stronger. If desired, several pig feeders may be placed in one field, and adjusted to serve different sized pigs. By selecting the proper hole in each of the hole rows 26 for the bolts 27, the front of the bar 20 may be lowered or raised for adjusting the vertical space between the base platform and the bar 20. The bar guard will pivot on the bolts 22. As the bar posts are rigid with the bar guard 20, and it is desired that they be adjacent the eave of the roof through the swinging movement of the bar guard, I have provided the slots 21 which permit the bar guard to reciprocate and compensate for this variation. Therefore, the bolts 22 should be first loosened, the bar guard adjusted by the bolts 27, and then the bolts 22 tightened. Once the bolts are all tightened, an effective horizontal selection guard bar above and spaced apart from the platform is provided. Some prefer that the U-shaped guard bar 20 always be maintained in a common horizontal plane. When this is desired, the correct hole in each row of holes 17 and 18 as well as the proper holes 26 are selected. By this arrangement the entire U- guard bar 20 is lowered or raised with pivoting and without any angling of the end portions of the bar to the horizontal.

In either adjustment both the front and ends of the housing will be adjustably vertically restricted.

From the foregoing it will be seen why I am separating the swine as to size by vertical restrictive means instead of the herebefore method of using vertical posts or vertical bars which attempt to separate the swine by horizontal restrictions. By eliminating the vertical bars or posts, the larger animals have no perches surfaces for knocking the device laterally. The result is that with my device the pig creep feeder may be placed at any location among all the integrated swine and without destruction. Furthermore, by eliminating horizontal bars and like, the small pigs do not become accidentally entrapped but can enter and back out easily and quickly. The two end walls and trough provide the compartment on the center of the platform. The roof and platform should, of course, extend in spaced relationship and horizontally a considerable distance from this center compartment area.

Both ends of the U-bar 20 and the means of fastening the same are identical. In Fig. 1, the left end portion of one bar is shown at one side and the right end portion of the opposite bar is also shown, inasmuch as the drawings illustrate a pig creep feeder capable of being entered at both sides.

Some changes may be made in the construction and arrangement of my pig feeder without departing from the real spirit and purpose of my invention, and it is my intention to cover by my claims, any modified forms of structure or use of mechanical equivalents which may be reasonably included within their scope.

I claim:

1. In a device of the class described, a platform, two spaced apart vertical end walls on said platform, a feeding trough between said two end walls, a canopy structure spaced vertically above said platform; said platform and said canopy structure extending horizontally away from said end walls and said trough, a U-bar member having its two ends each slotted, a bolt means extending through each of the slotted ends of said U-bar and said two end walls, respectively, a post member on said U-bar member having a number of holes, and a bolt means selectively extending through a hole in said post and secured to said canopy structure.

2. In a device of the class described, a platform, two spaced apart vertical end walls on said platform, a feeding trough between said two end walls, a canopy structure spaced vertically above said platform; said platform and said canopy structure extending horizontally away from said end walls and said trough, a U-bar member having its two ends each slotted, a bolt means extending through each of the slotted ends of said U-bar and said two end walls, respectively, a plurality of post members on said U-bar member each having a number of bolt holes, a bolt extending selectively through one of the holes of each of said posts and thence operatively connected to said canopy structure.

References Cited in the file of this patent
UNITED STATES PATENTS

| | | |
|---|---|---|
| 608,863 | Innis | Aug. 9, 1898 |
| 1,257,399 | Robbins | Feb. 26, 1918 |
| 1,437,462 | Belvel | Dec. 5, 1922 |